350-393 SR CROSS REFERENCE SEARCH ROOM

XR 3,430,212

APPARATUS FOR READING AND PRINTING STORED INFORMATION BY LIGHT

Filed May 25, 1964

INVENTORS
ERHARD MAX
GLENN T. SINCERBOX
BY Ralph C. Dustin
ATTORNEY

3430212

United States Patent Office 3,430,212
Patented Feb. 25, 1969

3,430,212
APPARATUS FOR READING AND PRINTING STORED INFORMATION BY LIGHT

Erhard Max, Wappingers Falls, and Glenn T. Sincerbox, Poughkeepsie, N.Y., assignors to International Business Machines Corporation, New York, N.Y., a corporation of New York Filed May 25, 1964, Ser. No. 369,961
U.S. Cl. 340—173 6 Claims
Int. Cl. G11b 7/00; G03c 7/00; G02b 1/00

ABSTRACT OF THE DISCLOSURE

Apparatus is provided for reading information stored in the form of light reflecting lasers in a storage medium. The information is stored in areas of the medium and selectively operated apparatus controls the access to a particular area for read out by acting on the polarization of an interrogating beam of radiation. The read out information may be printed out or displayed.

This invention relates to apparatus for either printing or displaying stored information, and more particularly to apparatus which is operable to read stored information selectively by means of light and to either print or display such information.

In a United States patent application, Ser. No. 332,755, filed Dec. 23, 1963, by Harold Fleisher et al., there is described an apparatus for producing a transparent film having thin layers of reflecting material at periodic intervals which are representative of information. The layers are formed by directing light through a photographically sensitive emulsion and reflecting the same light back through the emulsion. A standing wave is set up for each monochromatic light frequency, and the emulsion is modified at the antinodes of the standing waves so that, after processing and fixing, a plurality of light scattering layers are formed in depth in the film spaced at periodic intervals for each anhormonic frequency of information stored therein.

When light is directed against a film in which reflecting layers had previously been formed, a coherent reflective scattering of the light is obtained if it is of the same frequency as that which resulted in the original formation of the layers. Light of different frequencies will not be coherently reflected. This light is reflected incoherently from each of the many partially reflecting layers, resulting in a considerably reduced intensity relative to the coherent reflected light of a recorded anharmonic frequency in the storage area. Coherent light reflected from a selected storage area may be in the shape of a character and may be directed to a photosensitive medium or a screen for effecting either a printing or a display of the information. If desired, an interrogating light beam may be directed at the entire surface of the storage device for reading out complete pages of information which vary depending on the frequency of the light.

In a preferred form of the invention, a beam of light at a selected frequency and linearly polarized in a given plane is directed through a beam splitter and a plurality of electro-optic devices to areas on a transparent film in which information is recorded in the form of reflecting layers. When quarter-wave voltage is applied to any one of the electro-optic devices, plane polarized light passing through that device becomes circularly polarized. If the area receiving light from this device contains stored information corresponding to the light frequency, then the circularly polarized light is reflected back through the same electro-optic device and becomes plane polarized at 90 degrees to the original beams polarization direction.

The reflected light then passes through the beam splitter and a light deflector to a photosensitive medium for effecting a printing of the information. At each of the electro-optic devices not energized, light passes through them without any change in polarization and is reflected back to the beam splitter polarized in a plane which causes the light to return over the same path as that of the interrogating beam.

If the voltage applied to the electro-optic device is less than the quarter-wave voltage, the plane polarized light passing through this device becomes elliptically polarized. The elliptically polarized light reflected from the stored information passes back through the electro-optic device and is changed to another ellipitically polarized state. Only one component of this light passes through the beam splitter and light deflector to the photosensitive medium. The intensity of the light reaching the photosensitive medium is proportional to the voltage applied to the electro-optic device. This allows halftone reproduction of the stored information.

An object of this invention is to provide improved means for reading stored information selectively by means of light and causing it to be either printed or displayed.

Another object is to provide improved apparatus for directing light at a selected frequency to areas on an element in which information is stored in the form of light reflecting layers and causing light reflected from layers at any one of the areas to be directed to a light sensitive medium.

Still another object is to provide means for directing light of a selected frequency through a beam splitter and a plurality of electro-optic devices to different areas on an element in which information may be stored in the form of light reflecting layers, the electro-optic devices being selectively operable to change the polarization of light passing through them so that light reflected from any area is directed through the beam splitter to a light sensitive medium.

The foregoing and other objects, features and advantages of the present invention will be apparent from the following more particular description of the preferred embodiments of the invention as illustrated in the accompanying drawings.

Figures 1, 2:
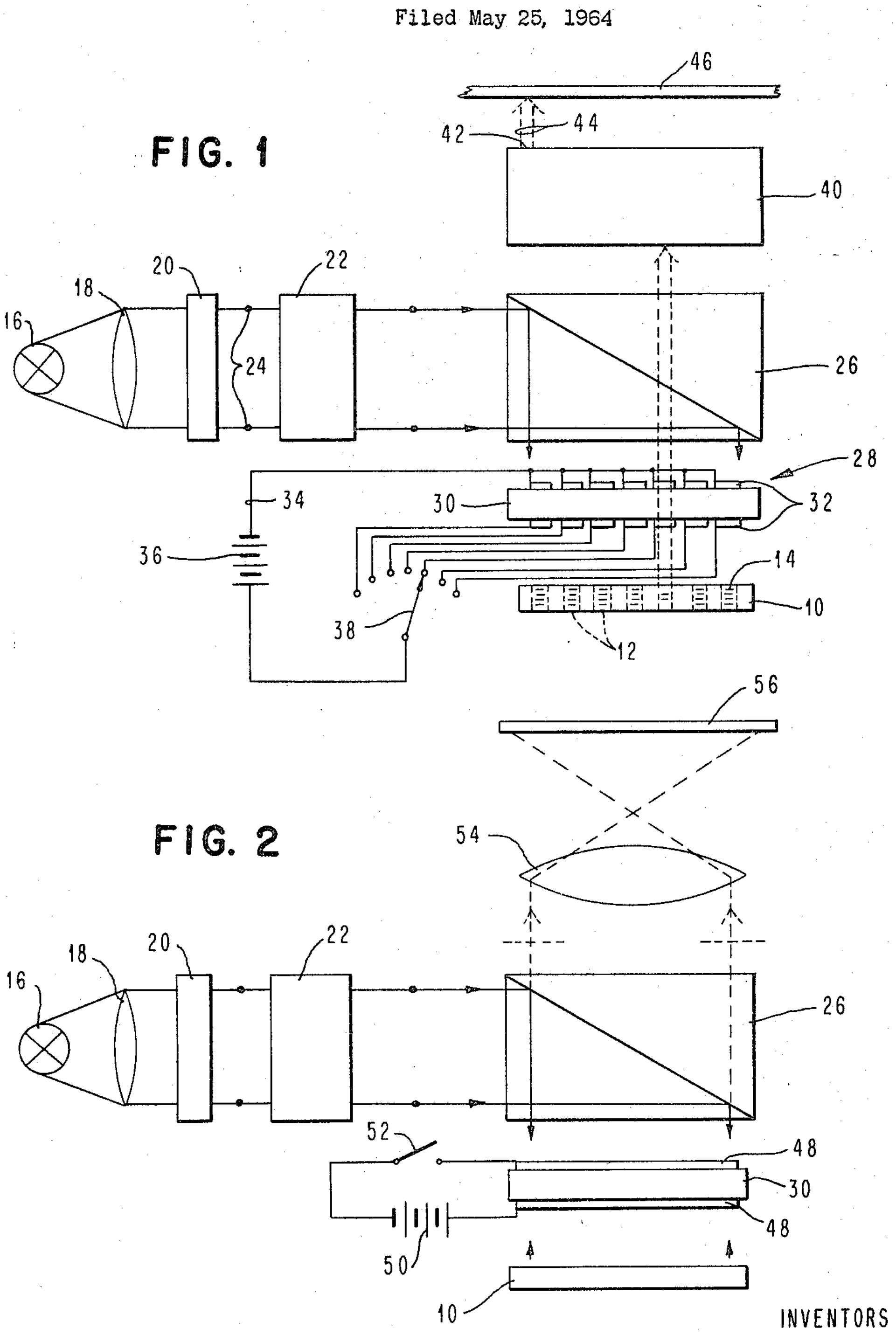
FIG. 1 is a schematic diagram of a system in which information may be read selectively from different areas on a storage element and printed on a photosensitive medium by means of light.
FIG. 2 is a schematic diagram similar to that of FIG. 1 but showing means for reading a full page of information and printing or displaying it on a suitable medium.

Referring to the drawings, and more particularly to FIG. 1, it will be noted that there is shown a storage element 10 in the form of a transparent film having a plurality of areas 12 at which information may be stored as represented by light reflecting layers 14. These layers may be in the shape of alphabetic or numeric characters, and the layers for any one of the characters are spaced from each other distances which are directly proportional to the frequency of the light which originally effected the depositing of material forming the layers. The light beam effecting the storage of any character in the film would, of course, be in the shape of the character to be stored. At any one area on the film there may be a number of different sets of reflecting layers, each set being of a different character shape and having the layers within it spaced differently than those of the other sets due to the use of different light frequencies in storing the characters. Such film is generally referred to as a Lippmann film and may be formed as described in the Fleisher et al. application referred to above.

When light is delivered to one of the areas 12 at a frequency equal to that which caused the formation of reflecting layers within the area, a coherent reflective scattering of the light is obtained from the layers. For directing light at a selected frequency to the different areas 12, there is provided a light source 16 from which light at all frequencies is delivered through a collimating lens 18 and a polarizer 20 to a controllable filter 22 adapter to pass only light of the desired frequency. Light from the polarizer 20 is linearly polarized in a plane perpendicular to the plane of the drawing as indicated by the dots 24, and the light at the selected frequency and the same polarization is directed from the filter 22 through a beam splitter 26 which deflects the light toward the film 10. The beam splitted 26 is a device that splits the beam according to polarization. Between the beam splitter 26 and the film 10 are controllable means 28 by which the polarization of the light in alignment with any one of the areas 12 may be changed. This means includes an electro-optic crystal 30, such as a potassium dihydrogen phosphate crystal, and a pair of transparent electrodes 32 at opposite sides of the crystal in alignment with each of the areas 12. When a certain voltage is applied across any pair of electrodes, the plane polarized light passing through those electrodes and the crystal 30 becomes circularly polarized. For applying a voltage across the electrode pairs selectively, one electrode of each pair is connected by a conductor 34 to one side of a voltage source 36, and the other electrodes are connected selectively through a switch 38 to the other side of the voltage source. The switching means shown herein is mechanical but it will be understood that any suitable electronic switching means may be employed. The characters stored at each area 12 and the frequency of light required to read each character will be known by the operator. To read a character at a particular area, the operator positions the switch 38 to apply quarter-wave voltage across the electrodes in alignment with that area and adjusts the filter 22 so that the frequency of the light delivered to the film corresponds to the frequency which caused the formation of the reflecting layers for the character desired. As the plane polarized light passes through the crystal 30 between the energized electrodes, it becomes circularly polarized. The light reflected from the layers 14 passes again through the crystal 30 between the energized electrodes and becomes plane polarized at 90 degrees to the original beams polarization direction. This portion of the reflected light is then polarized in the plane of the drawing and passes through the beam splitter 26 to a light deflector 40 which may be like that shown and described in an application, Ser. No. 285,832, filed June 5, 1963 by T. J. Harris et al. In this case, however, the deflector is operated in such a manner that a light beam entering the deflector at any point from the beam splitter is deflected to a common point 42 from which the light beam passes through a lens 44 to a photosensitive medium 46. Any suitable means, not shown, may be provided for feeding the medium 46 relative to the deflector 40 for effecting a printing of information on a line.

As light passes through the crystal 30 between energized electrodes, it also passes through the remainder of the crystal within the limits of the light beam from the beam splitter. It is possible that other areas 12 on the film have stored in them characters which could be read by the same light frequency as that being used to read a character under the active electrodes. At the other areas, however, the polarization of the light is not changed as it passes through the crystal 30. Any light reflected back at these areas remains polarized in a direction perpendicular to the plane of the drawing and is deflected by the beam splitter 26 toward the filter 22.

If it is desired that the stored information be printed in a brightness which is less than that obtained by the direction of light at its full reflected intensity to the photosensitive medium, such printing being referred to as halftones, then the electrodes 32 of the electro-optic devices may be subjected to less than quarterwave voltage. As the plane polarized light passes from the beam splitter through an electro-optic device energized at a lower voltage, it becomes elliptically polarized. Light reflected from the layers 14 through the energized electro-optic device becomes either further elliptically or circularly polarized. A component of this light will then pass through the beam splitter to the photosensitive medium while the remainder of the reflected light will be deflected toward the filter. It will be appreciated that the intensity of light delivered to the medium 46 may be adjusted to any desired value by controlling the voltage applied to the electrodes 32.

In FIG. 2 there is shown a system similar to that already described and has like parts designated by the same reference characters. The film 10, however, has information stored over its full surface as a picture or page of information to be displayed or printed. At opposite sides of the crystal 30 are two electrodes 48 extending over an area equal to that on the film 10 at which a reading is to be taken. These electrodes are subjected to a voltage from a source 50 when a switch 52 is closed.

Light at a selected frequency is delivered from the filter 22 through the beam splitted 26 and the crystal 30 to the film 10. If the electrodes 48 are energized, the light reflected from the film is polarized in a direction to pass through the beam splitter and a lens 54 to a medium 56 on which the information may be displayed or printed.

While the invention has been particularly shown and described with reference to preferred embodiments thereof, it will be understood by those skilled in the art that the foregoing and other changes in form may be made therein without departing from the spirit and scope of the invention.

What is claimed is:

1. Apparatus for reading and printing stored information by means of light comprising, in combination, a transparent film having different areas in which information is stored in the form of light reflecting layers spaced periodically distances varying with given light frequencies, said layers producing a coherent reflective scattering of light when the frequency of light directed upon them is proportional to their spacings, electro-optic devices associated with said areas and operable selectively to effect a change in the polarization of light passing therethrough, a beam splitter operable to pass linearly polarized light in different directions depending on the plane in which the light is polarized, means for delivering linearly polarized light of selected frequency through said beam splitter and said electro-optic devices to said film, said areas having layers spaced proportionally to the frequency of the light delivered to them causing a reflection of light through their associated electro-optic devices to said beam splitter, and a light responsive medium arranged to receive from said beam splitter any light reflected thereto through any one of said electro-optic devices which has been made effective.

2. The apparatus of claim 1 in which said means for delivering linearly polarized light comprises a light source from which light of different frequencies is obtained, means for linearly polarizing the light from said source, and a filter operable to pass light of a selected frequency from said polarizing means to said beam splitter.

3. The apparatus of claim 1 including a light deflector arranged between said beam splitter and said light responsive medium, said deflector operable to deflect light received from any point on said beam splitter to a common path between said deflector and said medium.

4. The apparatus of claim 1 in which said electro-optic devices comprise an electro-optic crystal, a pair of transparent electrodes at opposite sides of said crystal in alignment with each of the areas on said film, and means for applying a voltage across said pairs of electrodes selectively.

5. The apparatus of claim 1 in which said electro-optic devices are operable to effect a rotation of 45 degrees in the direction of polarization of light passing therethrough.

6. Apparatus for reading and printing or displaying stored information by means of light comprising, in combination, a transparent film having information stored therein in the form of light reflecting layers spaced periodically, distances varying with given light frequencies, said layers producing a coherent reflective scattering of light when the frequency of the light directed upon them is proportional to their spacings, a beam splitter operable to pass linearly polarized light in different directions depending on the plane in which the light is polarized, an electro-optic device arranged between said beam splitter and said film and being operable to effect a change in the polarization of light passing therethrough, means for delivering linearly polarized light of selected frequency through said beam splitter and said electro-optic device to said film, any layers in said film spaced proportionally to the frequency of the light delivered to them causing a reflection of light through said electro-optic device to said beam splitter, and a light responsive medium arranged to receive from said beam splitter any light reflected thereto through said electro-optic device when the latter has been made effective.

References Cited

UNITED STATES PATENTS 3,182,574 5/1965 Fleisher et al. ------- 350—150

OTHER REFERENCES

H. Fleisher and G. Sincerbox, "Mechanisms for Reading a Standing Wave Memory Simultaneously and Independently," IBM, TDB, vol. 6, No. 10, March 1964.

BERNARD KONICK, *Primary Examiner.*

JOSEPH F. BREIMAYER, *Assistant Examiner.*

U.S. Cl. X.R.

88—1; 96—2; 350—150